United States Patent Office 2,992,061
Patented July 11, 1961

2,992,061
REDUCING VAT DYES WITH HYDRAZINE-BORANE COMPOUNDS
Richard A. Fleming, Wilmington, Del., assignor to E. I. du Pont de Nemours and Company, Wilmington, Del., a corporation of Delaware
No Drawing. Filed Aug. 4, 1958, Ser. No. 753,130
6 Claims. (Cl. 8—34)

This invention relates to improved reduction baths for vat dyes and, more particularly, this invention relates to new and useful reducing agents.

In ordinary vat dyeing, the dye is treated with a strong reducing agent in the presence of alkali. The dye then becomes soluble and substantive towards the material to be dyed and exhausts into the fibers. After the dye has penetrated the material, reoxidation fixes the dye within the fibers in finely divided, water-insoluble form.

Sodium hydrosulfite, $Na_2S_2O_4$, has been the reducing agent for such baths for many years. The many advantages of using sodium hydrosulfite are somewhat offset by its sensitivity to air; it is rather easily destroyed by oxidation under the conditions required by some dyeing operations, particularly in the pad-jig process. A further disadvantage is that sodium hydrosulfite is too effective with some dyes; the reduction proceeds so fast as to create a control problem. The latter disadvantage is often encountered in the pad-steam and Williams processes. Frequently the use of over-reduction buffers is necessary.

When sodium hydrosulfite is oxidized by air to sodium hydrogen sulfite, the bath must be maintained at a high pH in order to prevent the formation of various sulfur products due to decomposition. The novel reducing agents of the present invention are not sensitive to air and, moreover, are effective under the same conditions as sodium hydrosulfite.

It is an object of the present invention to provide novel effective reducing agents for vat dyes.

It is another object of the present invention to provide vat dye reducing agents which are effective under the same conditions as sodium hydrosulfite without the attending disadvantages of the latter-named compound.

The above and other objects are accomplished using novel borane and diborane compounds as reducing agents wherein a $BH_3$ group is bonded to one nitrogen atom or both nitrogen atoms in hydrazine and substituted hydrazine compounds. These reducing agents are known as borane and diborane compounds and are represented by the below formula with either one or both N atoms having a $BH_3$ adduct bound thereto:

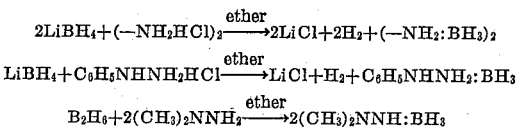

wherein $R_1$ and $R_3$ represent H, lower alkyl radicals having 1–3 C atoms, and phenyl and $R_2$ and $R_4$ represent H and lower alkyl radicals having 1–3 C atoms.

Representative of compounds of hydrazine and substituted hydrazines and $BH_3$ are hydrazine-diborane, $H_3B:NH_2NH_2:BH_3$; unsymmetrical dimethylhydrazine-borane, $(CH_3)_2NNH_2:BH_3$; phenylhydrazine-borane, $C_6H_5NHNH_2:BH_3$; hydrazobenzene-borane, $C_6H_5NHNHC_6H_5$
$BH_3$ and the like.

Simple methods for preparing the above compounds are illustrated by the following:

$$2LiBH_4 + (-NH_2HCl)_2 \xrightarrow{ether} 2LiCl + 2H_2 + (-NH_2:BH_3)_2$$

$$LiBH_4 + C_6H_5NHNH_2HCl \xrightarrow{ether} LiCl + H_2 + C_6H_5NHNH_2:BH_3$$

$$B_2H_6 + 2(CH_3)_2NNH_2 \xrightarrow{ether} 2(CH_3)_2NNH:BH_3$$

In the first two equations $LiBH_4$ is dissolved in anhydrous diethyl ether and an equivalent amount of anhydrous hydrochloride salt slowly added. When the reaction is essentially finished, indicated by the cessation of hydrogen bubbles, a simple filtration removes insoluble material.

The reaction may be carried out to substantial completion in about 1 hour at room temperature. Preferably, an excess (25–50%) of the amine hydrochloride is present and the reaction mixture is agitated.

The desired product is recovered from the filtrate by room temperature solvent evaporation. The evaporation of solvent is preferably stopped before the product begins to precipitate. The addition of petroleum ether will then precipitate the product.

In the third equation the hydrazine compound is dissolved in a solvent, such as anhydrous diethyl ether. Diborane is then reacted with the solution at room temperature, for example, by slowly passing the gas through the solution while stirring the reaction mixture. The product is recovered as above.

The compounds of the present invention will reduce indigoid and thioindigoid dyes in the same manner as sodium hydrosulfite. In addition to indigo, thioindigo and derivatives thereof, the novel reducing agents are also suitable for reducing anthraquinone vat dyes and may be used in dye baths for cotton, linen, rayon and the like in the various stages of manufacture. Likewise these novel reducing agents are, in general, suitable in processes for dyeing wool and silk under the conditions imposed by the nature of these materials.

The hydrazine and substituted hydrazine borane reducing agents may be used in both reduced and pigment methods of dyeing and may be used in applications by pad-steam and other continuous methods. They are also compatible with those assistants, such as wetting agents, etc., when such assistants are normally employed in vat dyeing. In summary, the novel reducing agents can be substituted for sodium hydrosulfite as a reducing agent in vat dyeing processes and these novel agents may be advantageously employed under the same conditions.

Vat dyes vary individually in the ease with which they can be reduced. The least soluble dyes require higher temperatures and more caustic soda for maintenance of solubility. Certain other dyes require special aftertreatment for development. In particular, the use of an oxidizing agent is often required when sodium hydrosulfite is the active reducing agent. The use of the novel reducing agents of the present invention has the added advantage that when vat dyes are reduced with these agents, an oxidizing agent is seldom required. Air oxidation appears to be sufficient to fix vat dyes so reduced, since the dyes do not become overreduced.

From the above it can be seen that the exclusive use of sodium hydrosulfite lends little if any flexibility to dyeing processes when vat dyes having varying characteristics are employed. The use of the novel reducing agents of the present invention, however, confers flexibility, since these agents also differ in their respective reducing powers. Selection can be made from the hydrazine and substituted hydrazine boranes of the present invention, depending on the particular dye used.

Hydrazine-borane is approximately equal to sodium hydrosulfite in reducing power; phenylhydrazine-borane is somewhat slower than either of these reducing agents but still reduces vat dyes effectively and smoothly.

The following examples illustrate the use of the reducing agents in baths containing dyes representative of a dye reduced with difficulty, red—Prototype 124; a dye easily reduced, yellow—Color Index No. 1118; and a dye reducible with intermediate difficulty, jade green—Color Index No. 1101.

*Example 1*

A suspension of 1 g./l. red, Prototype 124, is prepared in an aqueous solution made alkaline with 0.5 M NaOH. Solid phenylhydrazine-borane, 3 g./l., is dissolved in a bath maintained at 45° C. After the bath has changed to a blue color, a piece of cotton broadcloth is saturated with the solution. Upon exposure to air the cloth's color becomes red.

*Example 2*

An aqueous alkaline (0.5 M NaOH) suspension of 1 g./l. jade green dye, Color Index 1101 (22' dimethoxydizenzanthrone) is prepared at 45° C. The reducing agent, 3 g./l. of phenylhydrazine-borane, is then added. The green color changes in less than 5 minutes from green to blue. A piece of cotton broadcloth is padded with the solution and exposed to air. The color of the cloth rapidly becomes jade green.

Hydrazobenzene-borane, 2 g./l., is substituted for phenylhydrazine-borane in the above experiment. Reduction of the jade green dye takes place, and the treated broadcloth is dyed evenly and effectively.

*Example 3*

Cotton broadcloth is dyed at 45° C. in a bath containing 0.5 M NaOH, 1 g./l. of yellow dye, Color Index No. 1118, and 2 g./l. of unsymmetrical dimethylhydrazine-borane. The cloth, upon exposure to air, changes from blue to yellow. Similarly, 1 g./l. of hydrazine-diborane, when substituted for unsymmetrical dimethylhydrazine-borane, rapidly reduces the yellow dye to a blue color.

In general, caustic concentrations may vary from 0.01–5 M, although a concentration within the range of 0.25–1 M is preferred. Variations in the temperature of the baths from 100° C. to room temperature (about 25° C.) are suitable with the preferred temperature being about 45° C. These conditions are usually employed in conventional vat dyeing processes. It is well known that by increasing the bath's temperature and using higher concentrations of caustic, the speed of reduction of the dye can be increased. The novel reducing agents also appear to be more effective under the same conditions.

The amount of reducing agent to be used will, of course, depend upon the reducing agent itself, the concentration of dye and the type of dye to be reduced. Generally, it may be stated that hydrazine and substituted hydrazine boranes may be employed under the same conditions in equivalent amounts as sodium hydrosulfite. For instance, it has been found that about a concentration of 0.01 N phenylhydrazine-borane will effectively reduce 0.2 g./l. of the jade green dye referred to in Example 2 when solution contains 0.5 M NaOH and the bath is 45° C.

As noted above, the hydrazine and substituted hydrazine-boranes vary in their power to reduce just as the various vat dyes vary in their resistance to reduction. All of the novel reducing agents will reduce dyes under some conditions. One skilled in the art can readily determine the optimum conditions and the most suitable reducing agent for reducing a particular dye.

The embodiments of the invention in which an exclusive property or privilege is claimed are defined as follows:

1. In a process for vat dyeing textile fibers wherein a vat dye is solubilized in an aqueous alkaline solution and absorbed by the fibers, the step of reducing and solubilizing said dye with a compound selected from the boranes and diboranes of

$R_1$ and $R_3$ represent H, lower alkyl having from 1–3 C atoms, and phenyl; $R_2$ and $R_4$ represent H and lower alkyl having 1–3 C atoms.

2. In a process for vat dyeing textile fibers wherein a vat dye is solubilized in an aqueous alkaline solution and absorbed by the fibers, the step of reducing and solubilizing said dye with phenylhydrazine-borane.

3. In a process for vat dyeing textile fibers wherein a vat dye is solubilized in an aqueous alkaline solution and absorbed by the fibers, the step of reducing and solubilizing said dye with hydrazobenzene-borane.

4. In an aqueous alkaline dyeing bath for textile fibers of the type wherein a vat dye is reduced and solubilized before being absorbed by the fibers, the combination with said bath of a reducing agent compound selected from the group consisting of boranes and diboranes of

$R_1$ and $R_3$ represent H, lower alkyl having from 1–3 C atoms, and phenyl; $R_2$ and $R_4$ represent H and lower alkyl having 1–3 C atoms.

5. In an aqueous alkaline dyeing bath for textile fibers of the type wherein a vat dye is reduced and solubilized before being absorbed by the fibers, the combination with said bath of the reducing agent compound, phenylhydrazine-borane.

6. In an aqueous alkaline dyeing bath for textile fibers of the type wherein a vat dye is reduced and solubilized before being absorbed by the fibers, the combination with said bath of the reducing agent compound, hydrazobenzene-borane.

References Cited in the file of this patent

UNITED STATES PATENTS

| 2,745,788 | Frohnsdorff et al. | May 15, 1956 |
| 2,827,357 | Hannay et al. | Mar. 18, 1958 |

OTHER REFERENCES

Schechter et al.: "Boron Hydrides and Related Compounds," Callery Chemical Co., pp. 60 and 61, March 1951.

Schechter et al.: "Boron Hydrides and Related Compounds," Callery Chemical Co., p. 28, December 1953.

UNITED STATES PATENT OFFICE
CERTIFICATE OF CORRECTION

Patent No. 2,992,061                        July 11, 1961

Richard A. Fleming

It is hereby certified that error appears in the above numbered patent requiring correction and that the said Letters Patent should read as corrected below.

Column 2, line 8, the equation should appear as shown below instead of as in the patent:

$$B_2H_6 + 2(CH_3)_2NNH_2 \xrightarrow{ether} 2(CH_3)_2NNH_2:BH_3$$

column 3, line 26, for "dizenzanthrone" read -- dibenzanthrone --; column 4, line 31, for "anaqueous" read -- an aqueous --.

Signed and sealed this 28th day of November 1961.

(SEAL)
Attest:

ERNEST W. SWIDER                            DAVID L. LADD
Attesting Officer                              Commissioner of Patents